Figure 1:
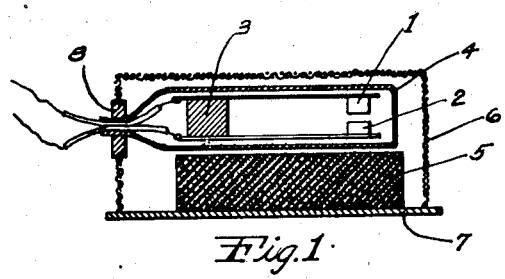

Dec. 9, 1947.   G. J. C. ANDRESEN   2,432,367
LEAK DETECTOR
Filed Sept. 23, 1943

Inventor
Gilbert J. C. Andresen

By
Attorney

Patented Dec. 9, 1947

2,432,367

UNITED STATES PATENT OFFICE 2,432,367

LEAK DETECTOR

Gilbert J. C. Andresen, Akron, Ohio, assignor to Wingfoot Corporation, Akron, Ohio, a corporation of Delaware Application September 23, 1943, Serial No. 503,499

3 Claims. (Cl. 200—52)

This invention relates to a device for detecting leakage of fluids. It is particularly useful in detecting leakage of inflammable or explosive fluids, such as gasoline or gasoline vapors.

There are many situations in which it is desirable and sometimes essential to know whether leakage of fluid is taking place. In many instances, portions of the structure involved are not readily accessible for inspection and therefore leakage can be determined only by a "remote control" device which can be placed at the points where leakage is to be determined and will then operate a bell, light, or other signal when leakage occurs. In some structures where inflammable or explosive fluids are used, considerable danger may be created by undetected leakage of the inflammable or explosive fluid. For example, gasoline tanks in boats and airplanes are frequently situated in closely confined compartments in which it is practically impossible to make satisfactory inspections to make sure that no leakage is taking place.

One object of the present invention is to provide a device which can be placed at suitable locations and, by operating a signal, indicate leakage of fluid. A further object of the invention is to provide such a device which is particularly adaptable to use with inflammable or explosive fluids. Other objects and advantages will appear as the description proceeds.

According to the invention, the leak-detecting device comprises a pair of oppositely disposed electrical contact points. These are normally spaced apart but one or both are movable so that the points may be brought into contact. Underlying one or both of the contacts is a material which is sensitive to the fluid whose leakage is to be detected and which swells on contact with and absorption of the leaking fluid. The electrical contact points and the underlying swellable material are confined in a structure of sufficient rigidity so that expansion of the swellable material forces the electrical contacts together. By having the contacts connected in a suitable electric circuit, the closure of the contacts completes the circuit and may be made to actuate a light, bell or other signal. The swellable material is preferably readily deformable by compressive forces so that after the contacts are forced together, the swelling forces will be diverted and dissipated and will not destroy the device. In order to minimize corrosion or other attack of the contact points and associated parts by the leaking fluid, the contact points are preferably disposed so that they are inaccessible to the leaking fluid. This is readily accomplished by sealing the contacts in a flexible bag made of material which is resistant to and impervious to the leaking fluid. The contacts may also be rendered inaccessible to the fluid by other means. This preferred form of the invention is especially desirable when gasoline or other inflammable or explosive fluid is to be detected since, by keeping the electrical contacts inaccessible to the fluid, there is a minimum of fire hazard due to sparking between the contacts.

Figure 2:
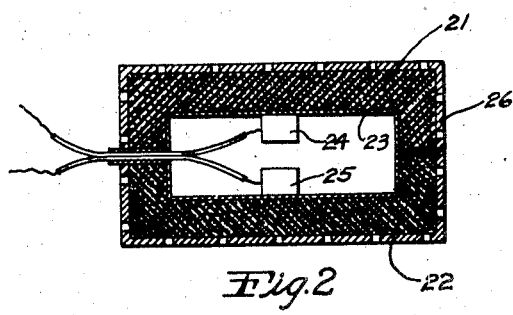
Figure 3:
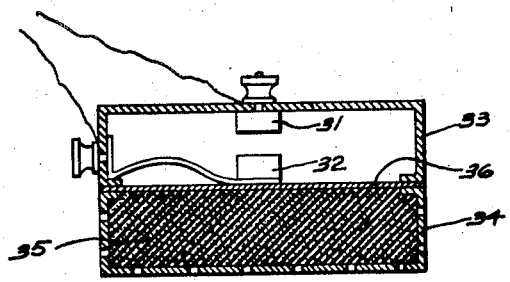
Figure 4:
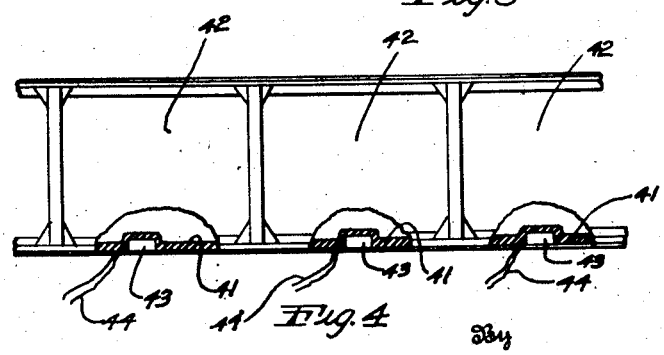

The nature of the invention will be more readily understood by reference to the attached drawing, in which Figs. 1 to 3 are sectional views of three specific embodiments of the invention and Fig. 4 is a semi-diagrammatic view showing a general arrangement of fuel tanks and leak detectors in the fuel compartments of an airplane, boat or the like.

Referring to Fig. 1, a pair of resilient electrical contacts 1 and 2 is mounted on a suitable insulating separator 3. This structure is enclosed in a flexible bag 4, which is impervious to the fluid to be detected. For example, if the device is to be used to detect the leakage of gasoline, the bag may suitably be made from a thin film of the synthetic linear polyamide marketed under the name "nylon." Underlying one of the electrical contacts 2 is a block of sponge rubber 5. The electrical contacts and the block of sponge rubber are enclosed in a substantially rigid structure shown in the drawing as a wire mesh screen 6 fastened, for example by soldering, to a base 7. The wires from the electrical contacts, surrounded by the flexible impervious bag, pass out through the surrounding screen through a grommet 8. In practice, the device may be placed at the lowest point in the airplane wing compartment which contains the fuel tank, and the wires are carried to the cockpit to operate, in conjunction with a suitable source of electric power, an indicator light. If the fuel tank begins to leak, the gasoline will run to the location of the indicator and a few drops of gasoline passing through the screen 6 into contact with the block of sponge rubber 5 will cause the rubber to swell and, in swelling, press the electrical contacts together, completing the electrical circuit and operating the signal light in the cockpit. The pilot will immediately be informed of the leakage.

In Fig. 2, two hollowed-out sponge rubber blocks 21 and 22 are placed together with the hollowed-out portions forming a cavity therebetween. A flexible liner 23 lines the cavity, a film of nylon being suitable when the device is to be used for the detection of gasoline leakage. Electrical contact points 24 and 25 are fastened to opposite faces of the lined cavity with electrical lead wires passing out through the structure and the entire structure is fastened together in a substantially rigid, pervious frame 26. This is shown in Fig. 2 as made in two halves, which serve to hold the structure together and clamp the edges of the flexible, impervious liner so that it is sealed off. On absorption of the leaking gasoline, the sponge rubber blocks swell and force the contact points together, completing the circuit.

In Fig. 3, electrical contacts 31 and 32, the latter of which is a spring contact moveable toward and away from the other, are fastened to an impervious shell 33. A perforated shell 34 contains a block of sponge rubber 35 and the two shells 33 and 34, when placed together, hold the edges of an elastic impervious film 36 which, if the device is to be used to detect the leakage of gasoline, may suitably be made of a gasoline-resistant synthetic rubber.

If desired, any of the forms of the device illustrated in Figures 1 to 3 may be constructed with an opening in the end or side through which the swellable material may be removed and replaced.

In Fig. 4, fuel tanks or cells 41 (which, if desired, may be of the bullet-seal type) are placed in the fuel tank compartments 42 of an airplane wing or a motorboat or the like in conventional manner. A leak-detector 43 is placed under each tank, preferably in the lowest point in the compartment. Each leak-detector is suitably connected by lead wires 44 to a signalling device to give warning if any of the fuel tanks should leak.

The device as shown and described is particularly useful in detecting the leakage of gasoline. It is very sensitive, only a few drops of gasoline being required to actuate it. Danger of explosion is practically non-existent. The signal bell or light can be operated with a very small current, such as that produced by a dry cell, so that any spark caused by the opening and closing of the gap will be very weak. Moreover, the electrical contacts are preferably so placed as to be out of contact with the gasoline or its vapor and shielded therefrom by the impervious bag or film. Furthermore, the wire screen or other perforate enclosing structure serves as an explosion guard.

While the device has been particularly described as applicable to the detection of gasoline leakage, it may also be employed to detect the leakage of other fluids. For example it may be used to detect leakage of water and various other liquids by selecting a suitable swellable material sensitive to the liquid whose leakage is to be detected to actuate the electrical contacts and by choosing a bag or film of suitable material impervious to the liquid involved. Also, the device can be made sufficiently sensitive so that it can be used to detect the leakage or presence of vapors and gases. Thus, by suitable proportioning and adjustment of the parts, the forms of the device shown in Figures 1 to 3 and described above can be used to detect the leakage or presence of gasoline vapors.

What I claim is:

1. A device for detecting leakage of inflammable or explosive fluids and the like, said device comprising a switch embodying a pair of spaced contacts; flexible means impervious to the fluid for shielding the switch; and means swellable upon absorption of fluid for exerting force against the shielding means to bring the contacts of the switch together.

2. A device for detecting leakage of inflammable or explosive fluids and the like, said device comprising a housing; a switch enclosed in the housing embodying a pair of contacts which are normally spaced apart; flexible means in said housing for shielding the switch from the fluid; and means swellable upon absorption of fluid for exerting pressure against the shielding means to close the switch contacts, said means being so disposed in the housing that it will be exposed to the fluid.

3. A device for detecting leakage of inflammable or explosive fluids and the like, said device comprising a housing having at least one perforate outer wall; a switch enclosed in the housing embodying a pair of contacts which are normally spaced apart; fluid impervious flexible means in said housing for shielding the switch from the fluid; and disposed within the housing and adjacent the perforate wall means swellable upon absorption of fluid for exerting pressure against the shielding means to close the contacts of the switch.

GILBERT J. C. ANDRESEN.

REFERENCES CITED

The following references are of record in the file of this patent:

UNITED STATES PATENTS

| Number | Name | Date |
|--------|------|------|
| 2,258,554 | Heyer et al. | Oct. 7, 1941 |
| 1,895,976 | Dornier | Jan. 31, 1933 |
| 1,791,375 | Porter | Feb. 3, 1931 |
| 2,137,024 | Moore et al. | Nov. 15, 1938 |